United States Patent [19]

Amendolia et al.

[11] Patent Number: 5,288,977
[45] Date of Patent: Feb. 22, 1994

[54] SYSTEM FOR IMPRINTING PATIENT-IDENTIFYING BARCODES ONTO MEDICAL X-RAYS

[76] Inventors: Pasquale J. Amendolia, Box 475, St. James, N.Y. 11780; Stanley Miller, 400 Soundview Dr., Rocky Point, N.Y. 11770

[21] Appl. No.: 862,800

[22] Filed: Apr. 3, 1992

Related U.S. Application Data

[63] Continuation of Ser. No. 637,408, Jan. 4, 1991, abandoned.

[51] Int. Cl.$^5$ .......................... G03B 42/04; H05G 1/26
[52] U.S. Cl. ...................... 235/375; 378/166; 378/188
[58] Field of Search ............ 235/375, 462, 380; 354/105, 106, 276; 378/165, 166, 188

[56] References Cited

U.S. PATENT DOCUMENTS

| | | | |
|---|---|---|---|
| 4,507,797 | 3/1985 | Kato | 378/166 |
| 4,702,580 | 10/1987 | Denner | 354/106 |
| 4,857,716 | 8/1989 | Gombrich et al. | 235/375 |
| 4,860,330 | 8/1989 | Strömmer et al. | 378/166 |
| 4,983,996 | 1/1991 | Kinoshita | 354/106 |
| 4,987,434 | 1/1991 | Soshi et al. | 354/106 |
| 5,136,626 | 8/1992 | Ort | 378/165 |

FOREIGN PATENT DOCUMENTS

| | | | |
|---|---|---|---|
| 59-193445 | 11/1984 | Japan | 378/165 |
| 1-270044 | 10/1989 | Japan | 378/165 |
| 1-312535 | 12/1989 | Japan | 378/166 |

*Primary Examiner*—Davis L. Willis
*Assistant Examiner*—Edward H. Sikorski
*Attorney, Agent, or Firm*—Leonard Belkin

[57] ABSTRACT

An X-ray cassette 30 has a window 32 for mounting a back-lit LCD 34 to expose the film therein with patient identifying information in the form of a barcode. A strip of lead 38 opposite window 32 shields film 37 when cover 31 is closed. The LCD is activated after a sensor 56 connected to an X-ray tube 54 detects the discharge of X-rays. The patient identifying information may be read directly from the patient's bracelet 47 at the same time the X-ray is taken using barcode scanner 44.

1 Claim, 2 Drawing Sheets

SYSTEM FOR IMPRINTING PATIENT-IDENTIFYING BARCODES ONTO MEDICAL X-RAYS

This application is a continuation of our patent application Ser. No. 07/637,408 filed on Jan. 4, 1991, now abandoned.

BACKGROUND OF THE INVENTION

The present invention relates to barcoding and more particularly to the barcoding of X-ray film.

Extensive use of X-rays in hospitals and other facilities requires that each X-ray film be carefully and accurately marked with proper identification of the patient. In a typical situation, multiple exposures are taken for each patient, and patients are exposed one after the other as they are moved through the X-ray facility.

It is obviously critical that each film exposed be accurately marked with the patient's identifying information. With the large volume involved, it is seen that it is essential that the film be marked as close to the exposure as possible to insure this accuracy.

In spite of the many procedures put in place to insure proper identification, it can readily be appreciated that it will be marked with the wrong patient's identification. This could occur because the technician may be interrupted by a telephone call necessitating putting down temporarily the cassette holding the film before the exposure and identifying procedure is complete, or for any number of other reasons. When the mistake is made, there can be tragic implications for one or both of the patients involved, as well as exposure to liability of the institution responsible for the X-rays.

One system commonly in use today for placing identifying information on an X-ray film relies on printing such information photographically on a corner of the film prior to or after X-ray exposure. X-ray film prepared for exposure involves placing a sheet of such film within a cassette sealed against light. One side of the cassette is made of material which is transparent to X-rays. On the other side of the cassette there is mounted in one corner a small window with a sliding panel or door closing the opening. Typically, the patient is first exposed to the X-rays and then the exposed film is taken to a dark room where the door is opened and a transparent sheet with the patient's identifying information is put in place. A light is then flashed to expose the film in that corner to record that information photographically on the film. A small patch of lead can protect the corner opposite the opening to exposure by the X-rays.

Some cassettes do not have an opening or a window. In such situations, the film must be removed from the cassette in a dark room and then flashed with the information. This extra step, of course, improves the chances that an error will be made.

Between the time that the information is imprinted by exposure and the taking of the X-ray, the possibility exists, as already noted, that an error can be made. If the technician is rushed, and is handling a number of cassettes at one time, and in several locations, which is not unusual today, there is significant risk that such a mistake can be made.

SUMMARY OF THE INVENTION

In this invention many of the shortcomings and drawbacks of systems now in use for placing patient identifying information on exposed X-ray film are overcome or substantially avoided by applying a barcode or other such information to the X-ray film simultaneously or substantially simultaneously with the X-ray exposure itself.

In one preferred embodiment of this invention there is provided a system for photographically imprinting an identifying barcode on the X-ray film utilizing a back lit LCD simultaneously or substantially simultaneously with the exposure of the film to the X-rays. For this purpose, a device incorporating the LCD is mounted on the X-ray film cassette covering an opening in the cassette with the LCD screen directly facing the film within the cassette. The LCD is energized to flash the patient's identifying information in barcode or other convenient form so that such information becomes permanently displayed on said film. This would be done at the same or substantially the same time the film is being exposed to the X-rays, while the cassette is mounted on the X-ray machine for such exposure.

By back lit LCD herein is meant a liquid crystal display device in which a source of light is provided behind an active-matrix of dots of a liquid crystal which becomes opaque blocking the passage of light when a voltage is applied to the liquid crystal. As is understood in the art, the application of an emf to each of the individual dots will create a display of any information conveyed which will block the light passing out the front of the LCD.

It is expected that the exposure to the LCD may take place while the cassette is mounted in the X-ray machine in which case the technician would have a separate switch to energize the LCD, or there may be a sensor or pickup to respond to actuation of the X-ray machine, although a short time delay may be introduced to avoid the voltage/current excursions or pertubations associated with the operation of an X-ray machine.

To further insure that no mistake will be made in the identification process, a scanner may be employed to read the barcode on an identification tag belonging to the patient when he or she appears for the X-ray and is in or about to get into position to be exposed. In this way, there is minimal human intervention involved in transferring the identification information thereby minimizing the opportunity for a mistake to creep in.

It is thus a principal object of this invention to provide an improved system for imprinting patient identification information on X-ray film.

Other objects and advantages of this invention will hereinafter become obvious from the following description of preferred embodiments of this invention.

DESCRIPTION OF THE PREFERRED EMBODIMENTS

Figure 1:
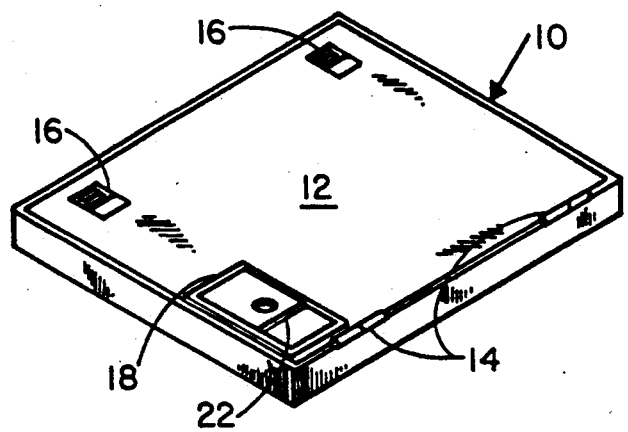
FIG. 1 is an isometric view of an X-ray film cassette now commonly in use.

Referring to FIG. 1, there is illustrated a typical X-ray film cassette 10 with a cover 12 hinged at 14 with latches 16 for either locking or permitting cover 12 to be opened. In one corner of cassette 10 is located in cover 12 an opening 18 with a sliding panel or door 22 shown in a partially open condition. The underside of cassette 10 which is not visible is made from a material opaque to light but transparent to X-rays. The other side of cassette 10 may have appropriate shielding.

To use cassette 10, latches 16 are released to open cover 12 and a sheet of unexposed X-ray film is inserted (in the dark), then cover 12 is closed. To place patient identifying material on the film, opening 18 is uncovered by sliding panel or door 22 open (in the dark) and a transparent label containing the information is placed over or on opening 18. A light is flashed to expose the film with that information, and then panel or door 22 is shut. Cassette 10 is then inserted into the X-ray machine where the patient is irradiated producing the desired image on the film. A small patch of lead (not shown) would be located in front of the film preventing further exposure where the patient identifying information is located. The patient identifying material may be placed on the X-ray film after the patient has been exposed.

In an environment where many patients are being processed, and multiple X-rays may be taken of each patient, the fact that the cassette has to be handled by a technician between the time that patient information is recorded and the X-ray is taken makes it possible that errors will occur, and, in fact, while statistically small, such errors do occur. Errors in identification, where patient's cassettes are inadvertently switched, can be very serious, so that extreme measures must be taken to avoid such situations.

Figure 2:
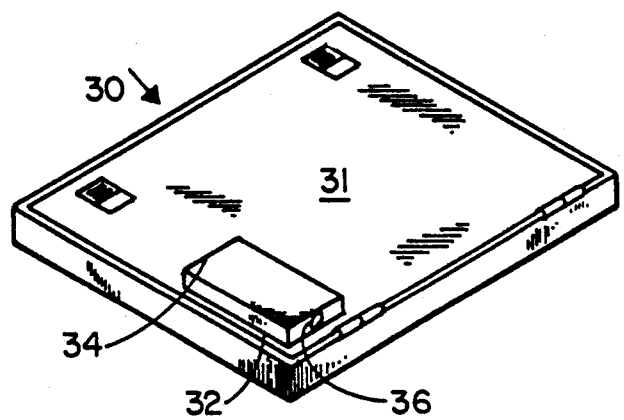
FIG. 2 is an isometric view of an X-ray film cassette modified in accordance with a preferred embodiment of this invention.
Figure 3:
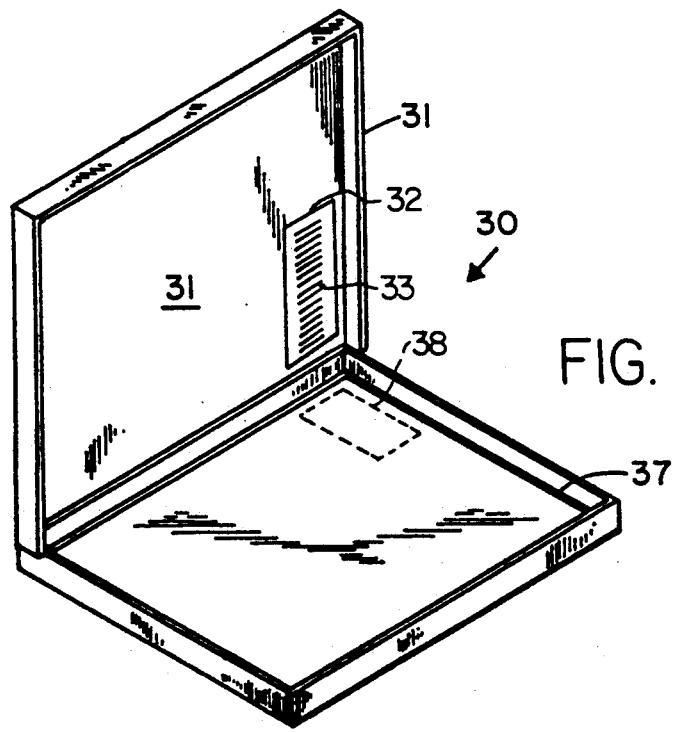
FIG. 3 is an isometric view of the cassette shown in FIG. 2 in an open position.

FIGS. 2 and 3 show a modified cassette 30 identical to cassette 10 except that instead of opening 18 with a door 22, there is provided in cover 31 an opening 32 with a back lit LCD 34 mounted thereon. LCD 34, which may be either mounted as a permanent part of cassette 30, or snapped into opening 32 with its screen 33 facing into cassette 30 in which case a cover or door (not shown) would be required for opening 32, is provided with a jack 36 for receiving its electrical input. As is understood in the art, any suitable optical system may be employed between the face of LCD 34 and the X-ray film.

As more particularly seen in FIG. 3, with cover 31 of cassette 30 open, opening 32 shows the face 33 of LCD 34 displaying whatever information is supplied to it for display. Also shown in a sheet 37 of X-ray film and a strip 38 of lead shielding under film 37 opposite window 32 when cover 31 is closed.

Figure 4:
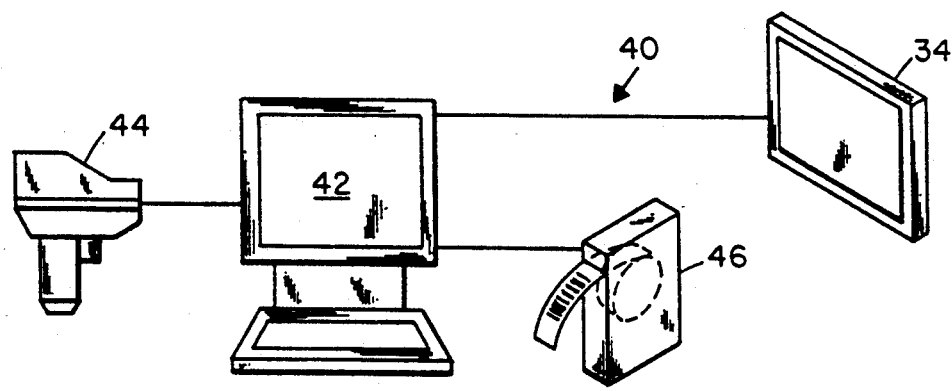
FIG. 4 is an illustrative diagram showing a system incorporating the principles of this invention.

LCD 34 when mounted on cassette 30 and connected for use as shown in FIG. 4 is part of a system 40 comprising a computer 42, a barcode scanner 44, and a barcode printer 46. In addition, it is understood that system 40 can be part of a larger system (not shown) in which billing information can be stored and printed out, diagnostic information recorded and made available, and treatment recorded, for each individual patient.

Figure 5:
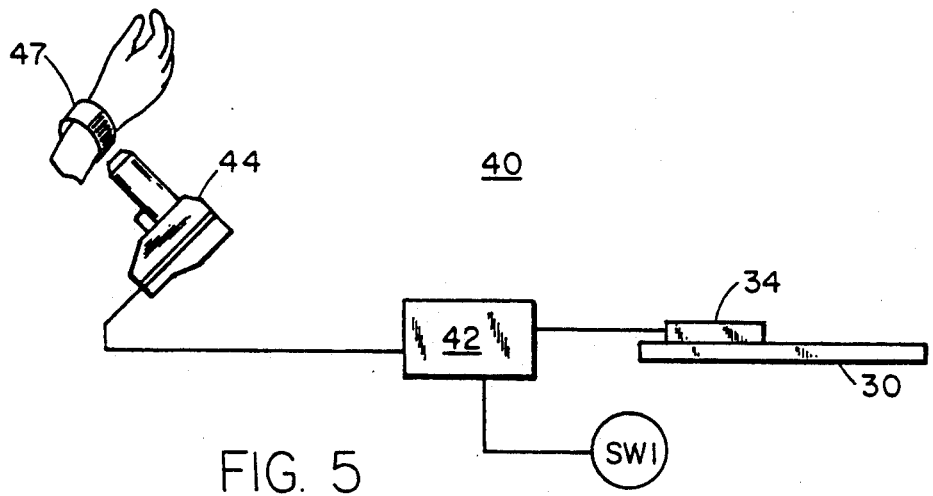
FIG. 5 is an illustrative diagram showing the system being used to pick up identifying information from a patient, and how such information is transferred to X-ray film in accordance with the principles of this invention.

In system 40, as seen in FIG. 5, scanner 44 can be utilized to scan the barcode on the patient's bracelet 47 when he or she enters the X-ray room and is prepared for irradiation, and stores that information in computer 40. Cassette 30 containing a sheet of X-ray film ready to be exposed, would be placed in the X-ray machine with LCD 34 connected to the cassette as illustrated. Shortly before or after the X-ray exposure, substantially simultaneously with the taking of the X-ray, the technician will close switch SW1 to generate a barcode in LCD 34 thereby imprinting that information on the film itself.

If desired, the patient, once placed in position for irradiation, reading of the barcode on the patient can occur simultaneously with the taking of the X-rays and the transfer of the barcode or other identifying information to the film in the cassette, thus insuring that no possibility of error exists.

When the fully exposed X-ray film is mounted on a light box, for example, for viewing, the barcode or other identifying information will appear in its normal form, that is, black with a white background, for reading by conventional scanning apparatus.

It should be noted that since computer 40, which could be a main frame for the whole institution, name, address, attending physician, social security number, etc., the system can be readily programmed to display in addition to or instead of the barcode, any other information which may be deemed to be either necessary or desirable.

In addition, while in FIGS. 4 and 5, the units of the system are shown wired together, they in fact could be linked together by radio, as is understood in the art. Furthermore, under the current state of the electronics art, some or all of the electronics included in computer 42 could be included in LCD 34, cassette 30, or even barcode scanner 44.

Figure 6:
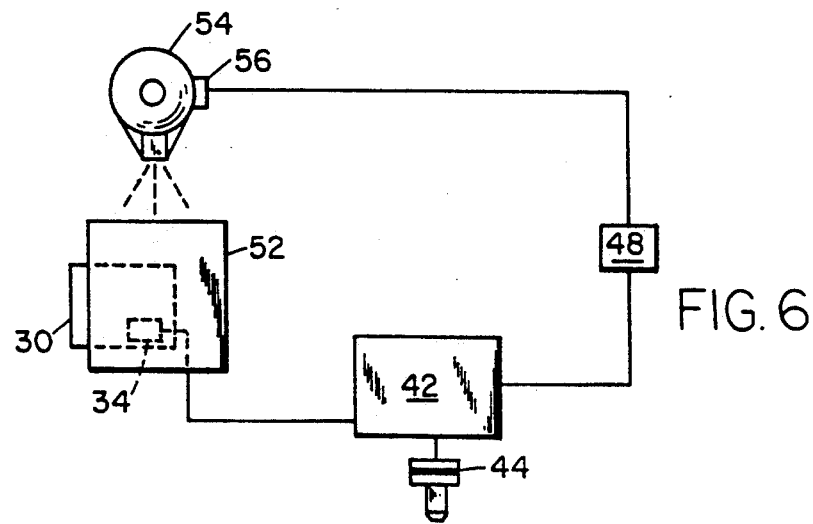
FIG. 6 is a block diagram showing one manner in which the system would be utilized during radiation exposure of a patient.

Another way in which cassette 30 can be employed is shown in FIG. 6. In this arrangement, cassette 30 is mounted under the X-ray table 52 on which the patient is placed, and computer 42 is shown connected to LCD 34. Connected to X-ray tube 54 is a sensor 56 which will detect the discharge of X-rays to activate LCD 34 simultaneously. A delay 48 may be inserted in the line so that LCD 34 will be activated a second or two later, to avoid current surges caused by the burst of energy used by X-ray tube 54. Sensor 56 may be an inductive coil to pick up the current surge associated with the operation of X-ray tube 54 or any other means responsive to operation of this device In this arrangement also, the patient's barcode can be read directly from the patient at the same time the X-ray is taken, and the patient identifying information is transferred to the X-ray film.

While the specific embodiments of this invention describe only the use of the LCD to supply the patient identfying information, it should be noted that other light generation electronic devices may be employed under some circumstances, such as a CRT or an LED. In addition, it might be desirable at times to employ the barcode scanner to read information directly from the screen of the LCD; equipment is commercially available which is capable of doing this.

It is understood that the present invention can be incorporated into a complete system based on the patient's barcode or other identification for integrating diagnosis, treatment, tests other than just X-rays, for example, blood and urine tests, etc., billing, and insurance payments While only certain preferred embodiments of this invention have been described, it is understood that many variations of this invention are possible without departing from the principles of this invention as defined in the claims which follow.

What is claimed is:

1. A patient identification system comprising means for reading a barcode associated with said patient, X-ray cassette means for containing unexposed X-ray film for receiving X-ray irradiation passing through said patient, said cassette comprising a hinged cover, means comprising a backlit LCD mounted in said cover for transferring said barcode to a portion of said X-ray film, and means for irradiating said unexposed X-ray film with X-ray radiation passing through said patient, said system including means having an inductive coil to pick up the current surge associated with the X-ray irradiation of said patient for reading and transferring said barcode from said patient to energize said LCD and thereby to imprint said barcode on said film in response to and simultaneously with irradiating said X-ray film.